(12) United States Patent
Foulboeuf

(10) Patent No.: US 11,274,640 B2
(45) Date of Patent: Mar. 15, 2022

(54) FLUID PIPE ARRANGEMENT

(71) Applicant: MANN+HUMMEL GmbH, Ludwigsburg (DE)

(72) Inventor: Gwenael Foulboeuf, Entrammes (FR)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/078,242

(22) Filed: Oct. 23, 2020

(65) Prior Publication Data

US 2021/0123399 A1 Apr. 29, 2021

(30) Foreign Application Priority Data

Oct. 23, 2019 (EP) .................................. 19290108

(51) Int. Cl.
*F02M 35/12* (2006.01)
*F02M 35/10* (2006.01)
*F02B 27/02* (2006.01)

(52) U.S. Cl.
CPC ..... *F02M 35/1255* (2013.01); *F02B 27/0205* (2013.01); *F02M 35/10098* (2013.01); *F02M 35/10268* (2013.01)

(58) Field of Classification Search
CPC ............. F02M 35/10268; F02M 35/04; F02M 35/1255; F02M 35/10144; F02M 35/10131; F02M 35/10013; F16L 9/18–20
See application file for complete search history.

(56) References Cited

U.S. PATENT DOCUMENTS

| | | | | | |
|---|---|---|---|---|---|
| 2,652,899 | A | * | 9/1953 | Brown | F02M 35/1255 181/256 |
| 5,038,725 | A | * | 8/1991 | Okazaki | F02M 35/10268 123/184.61 |
| 5,806,480 | A | * | 9/1998 | Maeda | F02M 35/10019 123/184.57 |
| 10,999,898 | B2 | * | 5/2021 | Geertsen | F16L 53/38 |

FOREIGN PATENT DOCUMENTS

| | | | | |
|---|---|---|---|---|
| DE | 1600569 A1 | | 5/1970 | |
| DE | 4136304 A1 | * | 5/1993 | ......... F01N 13/1805 |
| EP | 0670451 A2 | * | 9/1995 | ............. F16L 59/14 |
| EP | 1865185 A1 | * | 12/2007 | ....... F02M 35/10013 |
| EP | 2243938 A1 | * | 10/2010 | .......... F02B 29/0475 |

(Continued)

OTHER PUBLICATIONS

EP-2387869-A1 Machine translation of Description provided by ESPACENET (Year: 2021).*

(Continued)

*Primary Examiner* — Michael A Kessler

(57) ABSTRACT

The invention relates to a fluid pipe arrangement (100), in particular for a charged air duct of an internal combustion engine, comprising a housing (10) having a longitudinal extension (L). The housing (10) includes a first fluid duct (20) having a first fluid inlet (22) and a first fluid outlet (24) for a first fluid and at least one second fluid duct (30) having a second fluid inlet (32) and a second fluid outlet (34) for a second fluid. Thermal insulation means (40) are provided between at least a portion (38) of the second fluid duct (30) and at least a portion (28) the first fluid duct (20).

8 Claims, 3 Drawing Sheets

(56) References Cited

FOREIGN PATENT DOCUMENTS

| EP | 2387869 A1 | * | 11/2011 | ............ F02B 39/005 |
| EP | 2853727 A1 |   | 4/2015  | |
| FR | 2927126 A1 | * | 8/2009  | .......... F02B 29/0425 |
| GB | 2411711 A  |   | 9/2005  | |
| JP | 10047178 A | * | 2/1998  | .............. F02B 61/02 |

OTHER PUBLICATIONS

DE 1600569 A1 Machine translation of Description provided by ESPACENET (Year: 2021).*
EP-1865185-A1 Machine translation of Description provided by ESPACENET (Year: 2021).*

* cited by examiner

FLUID PIPE ARRANGEMENT

CROSS-REFERENCE TO RELATED APPLICATION

This application claims priority under 35 U.S.C. 119(b) to European Patent Application No. EP 19290108.0 having a filing date of 23 Oct. 2019. The entire contents of the aforesaid European Patent Application is incorporated herein by reference to the fullest extent permitted by the law.

TECHNICAL FIELD

The invention relates to a fluid pipe arrangement, in particular for a charged air duct of an internal combustion engine.

BACKGROUND

Air pipes of an internal combustion engine are dedicated to their own function, e.g. dirty air pipes, clean air pipes, hot air pipes, pressure pipes, which means that each duct must be implemented with a clearance requested between each component to avoid contact. The consequences of this architecture could have an impact on the pipe performances because the geometry of these parts must be modified to reach the clearances requested and the assembling constraints.

It is difficult to design several ducts inside a small package space allowed with a minimum clearance requested between each duct. At the end, the ducts designed could increase the pressure drop due to the complex routing.

The optimization of turbo engines to reach future emission regulations leads to more and more severe working conditions for charge air ducts. Limited package space in engine compartments is a prerequisite for air pipe arrangements of most vehicles.

EP2853727A discloses a charge air duct for delivering charge air to an intake manifold of an internal combustion engine comprising a housing with at least one charge air inlet and at least one charge air outlet. The charge air coming from the charger is split up into two flow paths, one being guided from the inlet to the outlet via a first duct in a first position of control means and another one being guided from the inlet to the outlet via a second duct in a second position of the control means, said first duct and said second duct being of different geometry.

SUMMARY

It is an object of the invention to provide a fluid pipe arrangement for limited design spaces, in particular for a charged air duct of an internal combustion engine.

The object of the invention is achieved by a fluid pipe arrangement, in particular for a charged air duct of an internal combustion engine, comprising a housing having a longitudinal extension, the housing including a first fluid duct having a first fluid inlet and a first fluid outlet for a first fluid and at least one second fluid duct having a second fluid inlet and a second fluid outlet for a second fluid, wherein thermal insulation means are provided between at least a portion of the second fluid duct and at least a portion the first fluid duct.

The other claims, the description and the drawings describe advantageous embodiments of the invention.

According to a first aspect of the invention, a fluid pipe arrangement is proposed, in particular for a charged air duct of an internal combustion engine or a fuel cell, comprising a housing having a longitudinal extension. The housing includes a first fluid duct having a first fluid inlet and a first fluid outlet for a first fluid and at least one second fluid duct having a second fluid inlet and a second fluid outlet for a second fluid. Thermal insulation means are provided between at least a portion of the second fluid duct and at least a portion the first fluid duct.

The inventive air pipe arrangement offers a compact solution which is able to be integrated inside a small mounting volume, in particular a small mounting volume at an engine compartment, and allows a design having few impact on the pressure drop of fluid flow because there is no need to get clearance between each duct.

The inventive air pipe arrangement may be used for fluid ducts, e.g. charge air ducts of internal combustion engines or fuel cells, in order to provide an integrated arrangement of fluid ducts with a limited external mounting space. Further the inventive fluid pipe arrangement may advantageously be used for intake air or other air pipes or fluid pipes, in particular water pipes or any positive pressure, in particular high pressure ducts. The fluid pipe arrangement may also be fixed to a housing of a fluid containing component. The fluid pipe arrangement exhibits compactness by maintaining robustness and offers a modular approach for connection of fluid ducts.

Advantageously the fluid pipe arrangement may be directly integrated into a charge air duct.

This concept could be of advantage to reach ambitious pressure drop requirements and get a compact design to be implemented into an internal combustion engine with less mounting volume available.

The thermal insulation means may provide a possibility to integrate a hot air duct into a cold air duct with a reduced transfer of heat from the hot air duct to the cold air duct. Thus an advantageous combustion process of the engine may be achieved with high efficiency.

According to an advantageous embodiment of the fluid pipe arrangement, the thermal insulation means may comprise a secondary pipe which at least partially encloses the second fluid duct. The secondary pipe may provide a useful possibility to integrate thermal insulation means around a hot air duct for minimum heat transfer to the ambient fluid such as of a cold air duct circumferencing the hot air duct.

According to an advantageous embodiment of the fluid pipe arrangement, the thermal insulation means may comprise a gap region between the portion of second fluid duct and a portion of the secondary pipe. The gap region may advantageously serve to be filled with thermal insulation means for efficiently insulating a hot air duct circumference by a cold air duct or vice versa.

According to an advantageous embodiment of the fluid pipe arrangement, a thermally insulating medium may be arranged in the gap region, in particular one of vacuum, air, a thermally insulating material. These thermal insulation means may serve for efficient thermal insulation of a hot air duct circumference by a cold air duct or vice versa. As thermally insulating material advantageously glass fibre may be used.

According to an advantageous embodiment of the fluid pipe arrangement, one or more openings may be provided in an outer wall of the housing, the one or more openings establishing a fluid connection between an ambiance and the gap region. The openings may serve for efficient exchange of ambient air and air filled in the gap region between the second fluid duct and the secondary pipe.

According to an advantageous embodiment of the fluid pipe arrangement, the one or more openings may be arranged at a front face of the housing, in particular the one or more openings being arranged about the first fluid outlet. Thus the openings may be in fluid connection with the gap region circumferencing the second fluid duct and serve for efficient exchange of ambient air and air filled in the gap region between the second fluid duct and the secondary pipe.

According to an advantageous embodiment the housing may have a straight longitudinal extension with an approximately rectangular block shape. The longitudinal extension of the housing may be curved, e.g. banana shaped. In another embodiment the housing may have a free form shape, e.g. drop-shaped, to get best fit into a given mounting space. The one or more openings may be arranged at an arbitrary position.

According to an advantageous embodiment of the fluid pipe arrangement, one or more openings may be arranged on opposite front faces of the housing, the one or more openings being arranged about the first fluid outlet. Thus the openings may be in fluid connection with the gap region circumferencing the second fluid duct and serve for efficient exchange of ambient air and air filled in the gap region between the second fluid duct and the secondary pipe. By arranging the openings on opposite front faces a more efficient exchange of the air between ambience and gap region may be achievable.

According to an advantageous embodiment of the fluid pipe arrangement, the first fluid duct and the second fluid duct may be at least partially arranged in a counterflow arrangement with opposite flow directions. This facilitates the integration of fluid ducts in a complex mounting volume situation. Further it may also be possible to realize a more efficient thermal insulation of the fluid ducts against each other.

According to an advantageous embodiment of the fluid pipe arrangement, the housing may be at least comprising a first housing part and a second housing part arranged along the longitudinal extension of the housing, in particular wherein the first housing part and the second housing part are connected along a circumferential flange of the housing. The housing parts may be manufactured in a plastics extrusion process or a plastics moulding process. Thus the two housing parts may be easily assembled and connected by standard plastics welding processes.

According to an advantageous embodiment of the fluid pipe arrangement, the first fluid inlet and the second fluid outlet may be members of the same one of the first or second housing parts and the first fluid outlet and the second fluid inlet are members of the other one of the second or first housing parts. Thus different complex arrangements of fluid ducts in the limited mounting space of a modern internal combustion engine may be realized.

According to an advantageous embodiment of the fluid pipe arrangement, the first fluid inlet may be arranged at a side wall of the housing, and the first fluid outlet and the second fluid inlet may be arranged at the front face of the second housing part and the second fluid outlet may be arranged at the front face of the first housing part opposite to the front face of the second housing part. Thus different complex arrangements of fluid ducts in the limited mounting space of a modern internal combustion engine may be realized.

According to an advantageous embodiment of the fluid pipe arrangement, the housing may comprise acoustic damping means, in particular an integrated resonance chamber, circumferencing the second fluid duct. In particular the secondary pipe may be configured as an acoustic damping means. Thus acoustic damping means may be integrated, in particular around the second fluid duct, which may conduct the compressed air from a turbo charger to the engine block. Thus efficient acoustic damping may also be integrated in a very compact design manner to the inventive fluid pipe arrangement.

BRIEF DESCRIPTION OF THE DRAWINGS

The present invention together with the above-mentioned and other objects and advantages may best be understood from the following detailed description of the embodiments, but not restricted to the embodiments, wherein is shown in.

DETAILED DESCRIPTION OF THE DRAWINGS

Figure 1:
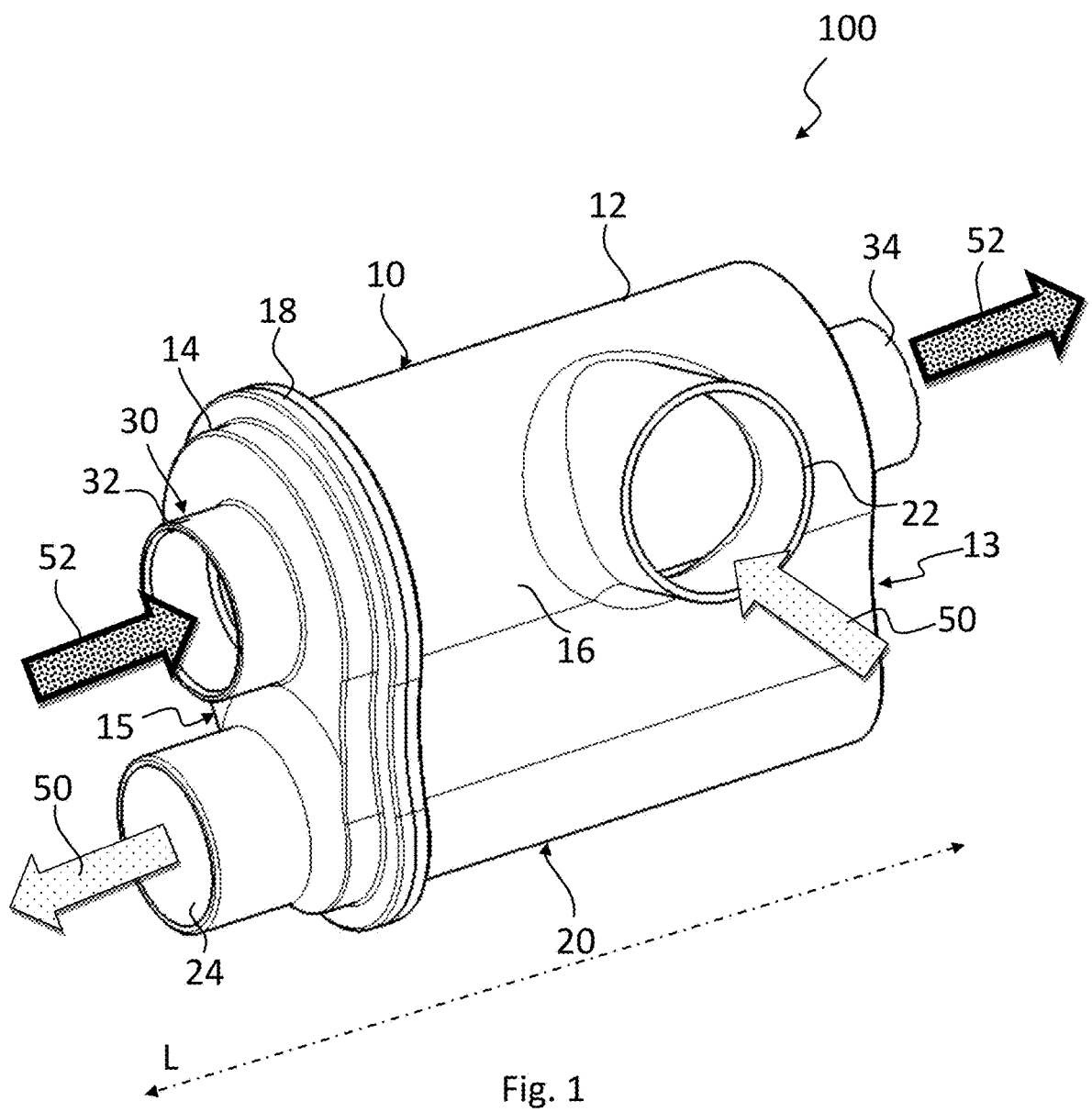
FIG. 1 an isometric view of an air pipe arrangement according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
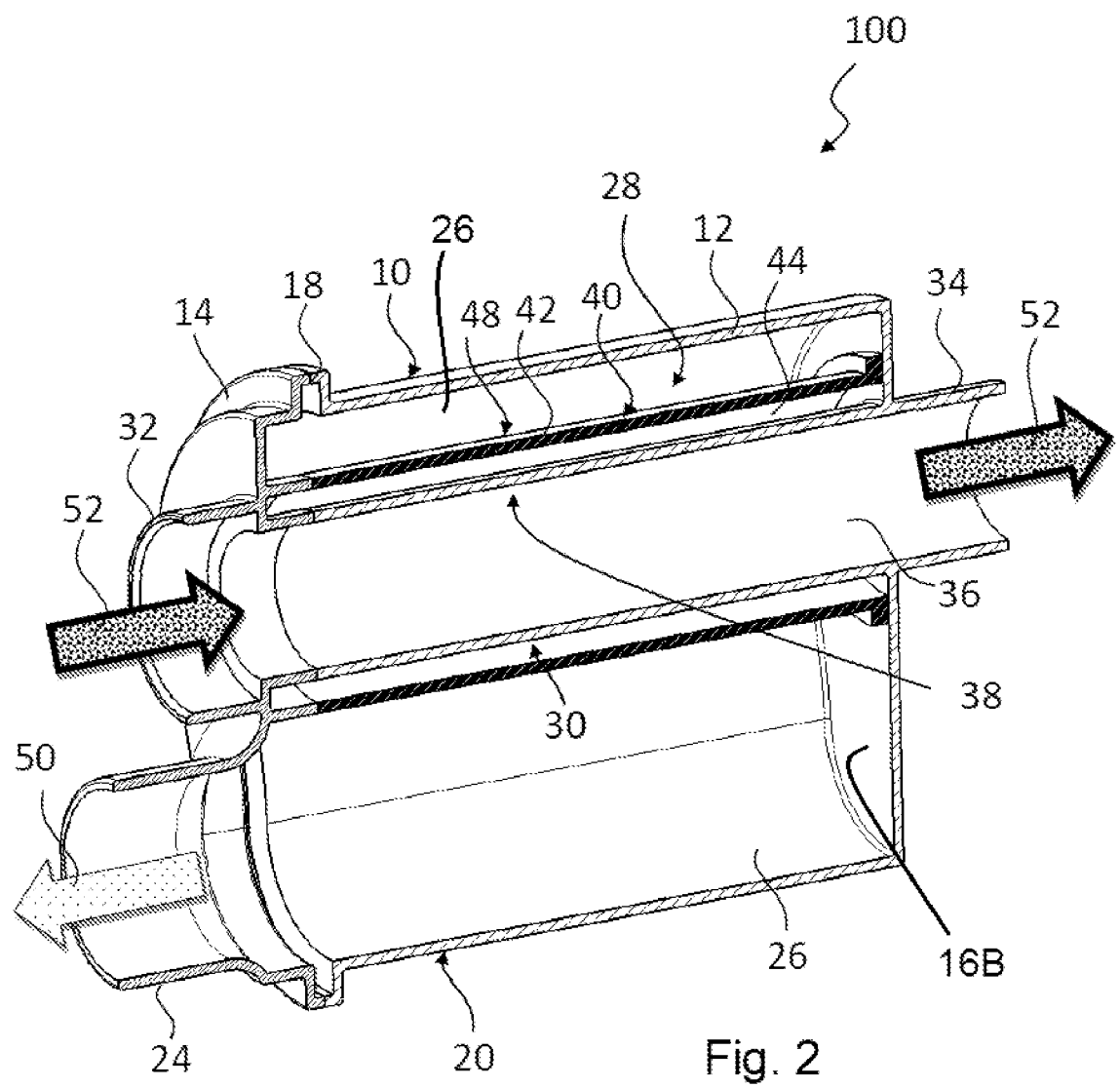
FIG. 2 a sectional view of the air pipe arrangement according to FIG. 1.

FIG. 1 depicts an isometric view of an air pipe arrangement 100 according to an embodiment of the invention, whereas in FIG. 2 a sectional view of the air pipe 100 arrangement according to FIG. 1 is shown.

The fluid pipe arrangement 100, which may serve in particular for a charged air duct of an internal combustion engine, comprises a compact housing 10 having a longitudinal extension L. The housing 10 includes a first fluid duct 20 having a first fluid inlet 22 and a first fluid outlet 24 for a first fluid and at second fluid duct 30 having a second fluid inlet 32 and a second fluid outlet 34 for a second fluid. The first fluid duct 20 may serve as cold air duct and the second fluid duct 30 may serve as a hot air duct. Flow directions of the first fluid flow and the second fluid flow are marked with arrows 50 and 52, respectively. As may be seen from the fluid flow directions 50, 52, the first fluid duct 20 and the second fluid duct 30 are at least partially arranged in a counterflow arrangement with opposite flow directions 50, 52.

The housing 10 comprises a first housing part 12 having a circumferential radially outer wall 16 extending circumferentially about the longitudinal axis L and an end wall 16B; and a second housing part 14 arranged along the longitudinal axis or extension L of the housing 10 and fixed onto a first axial end of the circumferential radially outer wall 16. In particular the first housing part 12 and the second housing part 14 are connected along a circumferential flange 18 of the housing 10. The circumferential flange 18 may be tightly connected by a welding process. As the housing parts 12, 14 may be advantageously manufactured from plastics material, a standard plastics welding process may be used for closing the flange 18.

In the embodiment shown in FIGS. 1 and 2, the first fluid inlet 22 and the second fluid outlet 34 are members of the same first housing part 12, and the first fluid outlet 24 and the second fluid inlet 32 are members of the other second housing part 14. Alternatively the first fluid inlet 22 and the second fluid outlet 34 may be members of the same second housing part 14, and the first fluid outlet 24 and the second fluid inlet 32 may be members of the other first housing part 12

The first fluid inlet 22 is arranged at a circumferential radially outer wall 16 of the housing 10. The first fluid outlet 24 and the second fluid inlet 32 are arranged at the axially outer face 15 of the second housing part 14. The second fluid outlet 34 is arranged at the end wall 16B of the first housing part 12 opposite to the axially outer front face 15 of the second housing part 14. As can been seen in FIG. 2 taken together with FIG. 1, the first fluid duct 20 is formed at least partially by the circumferential radially outer wall 16 and the end wall 16B of the first housing part 12. The second fluid duct 30 extends axially through the interior 26 of the housing 10 and is radially surrounded by the first fluid duct 20.

As can be seen in FIG. 2 thermal insulation means 40 are provided between at least a portion 38 of the second fluid duct 30 and at least a portion 28 the first fluid duct 20. The thermal insulation means 40 comprises a secondary pipe 42 which at least partially encloses the second fluid duct 30. In the embodiment shown the secondary pipe 42 encloses the second fluid duct 30 along the whole extension inside the housing 10.

The thermal insulation means 40 comprises a gap region 44 between the portion 38 of second fluid duct 30 and a portion 48 of the secondary pipe 42. This gap region 44 thus forms a closed volume around the second fluid duct 30 and encloses the second fluid duct 30 along the whole extension inside the housing 10. A thermally insulating medium may be advantageously arranged in the gap region 44, in particular one of vacuum, air, or a thermally insulating material, such as glass fibre. Thus a very efficient thermal insulation between the first fluid duct 20 and the second fluid duct 30 may be achieved.

Advantageously, the housing 10 may also comprise acoustic damping means, in particular an integrated resonance chamber, in particular circumferencing the second fluid duct 30. In particular, the secondary pipe 42 may be configured as an acoustic damping means.

Thus acoustic damping means may be integrated, in particular around the second fluid duct, which may conduct the compressed air from a turbo charger or compressor to the engine block. Thus efficient acoustic damping may also be integrated in a very compact design manner to the inventive fluid pipe arrangement.

Figure 3:
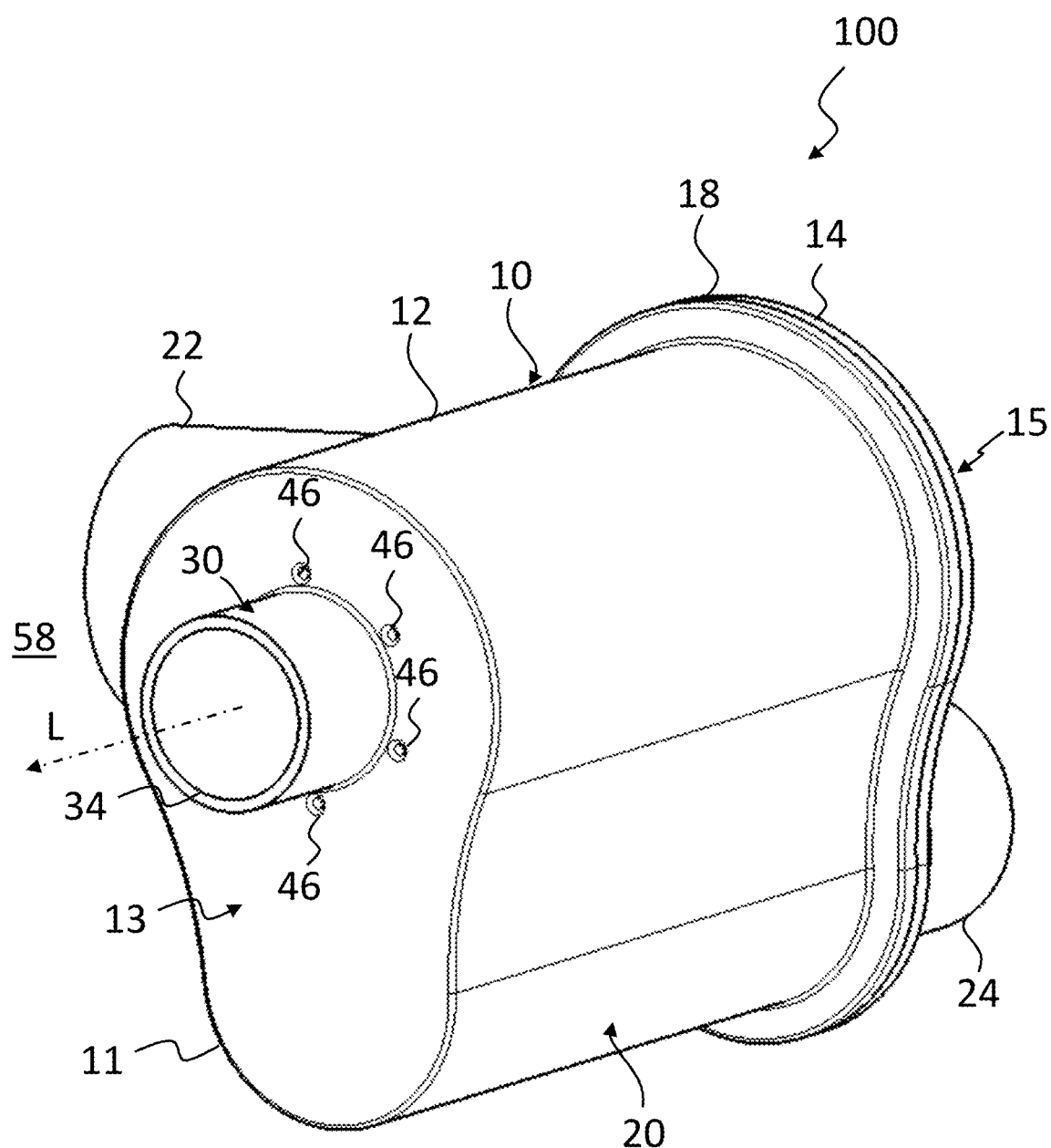
FIG. 3 an isometric view of an air pipe arrangement according to a further embodiment of the invention.

FIG. 3 depicts an isometric view of an air pipe arrangement according to a further embodiment of the invention.

As shown in FIG. 3, openings 46 are provided in an outer wall 11 of the housing 10, the one or more openings 46 establishing a fluid connection between an ambiance 58 and the gap region 44. The openings 46 are arranged at a front face 13 of the housing 10, in particular the one or more openings 46 being arranged about the second fluid outlet 34.

Thus the openings 46 may be in fluid connection with the gap region 44 circumferencing the second fluid duct 30 and serve for efficient exchange of ambient air 58 and air filled in the gap region 44 between the second fluid duct 30 and the secondary pipe 42.

In a further embodiment, the openings 46 may be arranged on opposite front faces 13, 15 of the housing 10, the one or more openings 46 being arranged about the first fluid outlet 24. By arranging the openings 46 on opposite front faces 13, 15, a more efficient exchange of the air between ambiance 58 and the gap region 44 may be achievable.

What is claimed is:

1. A fluid pipe arrangement for a charged air duct of an internal combustion engine, comprising:
    a housing elongated in a direction of a longitudinal axis (L) extending through an interior of the housing, the housing including:
        a first housing part having
            a circumferential radially outer wall extending circumferentially about the longitudinal axis (L) and surrounding the interior of the housing; and
            an end wall of the first housing part affixed onto a second axial end of the circumferential radially outer wall, closing over the interior;
        a second housing part forming a cover fixed onto a first axial end of the circumferential radially outer wall of the first housing part;
        a first fluid duct formed at least partially by the circumferential radially outer wall and the end wall of the first housing part, the first fluid duct having:
            a first fluid inlet formed on and opening through the circumferential radially outer wall of the first housing part into the interior;
            a first fluid outlet for a first fluid formed on and opening though an axially outer face of the second housing part,
            wherein the first fluid inlet is in fluid communication with the first fluid outlet through the first fluid duct;
        at least one second fluid duct extending axially through the interior of the housing and radially surrounded by the first fluid duct, the at least one second fluid duct having:
            a second fluid inlet arranged on and extending axially though the axially outer face of the second housing part;
            a second fluid outlet extending through the end wall of the first housing part,
            wherein the second fluid inlet is in fluid communication with the second fluid outlet through the at least one second fluid duct;
        a secondary pipe extending axially in the interior and spaced radially outwardly away from and radially surrounding the at least one second fluid duct, the radial spacing forming a gap between the secondary pipe and the at least one second fluid duct,
        wherein the radial spacing of the gap provides thermal insulation between at least a portion of the second fluid duct and at least a portion of the first fluid duct.

2. The fluid pipe arrangement according to claim 1, wherein
    one or more openings are provided in the end wall of the housing, the one or more openings establishing a fluid connection between an ambiance and the gap.

3. The fluid pipe arrangement according to claim 2, wherein
    the one or more openings are arranged about the first fluid outlet.

4. The fluid pipe arrangement according to claim 1, wherein
    the first fluid duct and the second fluid duct are at least partially arranged in a counterflow arrangement with opposite flow directions.

5. The fluid pipe arrangement according to claim 1, wherein
    the first housing part and the second housing part are connected along a circumferential flange of the housing.

6. The fluid pipe arrangement according to claim 1, wherein
   the first fluid inlet is arranged at a side wall portion of the circumferential radially outer wall of the housing.

7. The fluid pipe arrangement according to claim 1, wherein the housing comprises:
   an integrated resonance chamber for acoustic dampening circumferencing the second fluid duct;
   wherein the secondary pipe is configured as an acoustic damping means.

8. The fluid pipe arrangement according to claim 1, wherein
   a thermally insulating medium is arranged in the gap, the thermally insulating medium selected from the set of: a vacuum, air or a thermally insulating material.

* * * * *